(12) United States Patent
Ji

(10) Patent No.: US 8,283,876 B2
(45) Date of Patent: Oct. 9, 2012

(54) CIRCUIT FOR DRIVING AN INFRARED TRANSMITTER LED WITH TEMPERATURE COMPENSATION

(75) Inventor: Cang Ji, Kirchheim/Teck Nabern (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 317 days.

(21) Appl. No.: 12/586,549

(22) Filed: Sep. 24, 2009

(65) Prior Publication Data

US 2011/0062895 A1 Mar. 17, 2011

(30) Foreign Application Priority Data

Sep. 17, 2009 (EP) ..................................... 09368031

(51) Int. Cl.
*H05B 37/02* (2006.01)
(52) U.S. Cl. ..................... 315/309; 315/291; 315/227 R
(58) Field of Classification Search .................. 315/309, 315/367, 291, 227 R, 185 R; 323/312
See application file for complete search history.

(56) References Cited

U.S. PATENT DOCUMENTS

| | | | | |
|---|---|---|---|---|
| 4,733,217 | A * | 3/1988 | Dingwall | 341/122 |
| 4,956,591 | A | 9/1990 | Schierbeek et al. | |
| 5,790,615 | A | 8/1998 | Beale et al. | |
| 6,040,669 | A * | 3/2000 | Hog | 318/480 |
| 6,329,923 | B2 | 12/2001 | Hog | |
| 6,331,819 | B1 | 12/2001 | Hog | |
| 6,698,892 | B2 * | 3/2004 | Peterson | 353/29 |
| 6,781,539 | B2 | 8/2004 | Matsui | |
| 7,948,455 | B2 * | 5/2011 | Han et al. | 345/82 |
| 2002/0121901 | A1 * | 9/2002 | Hoffman | 324/426 |
| 2006/0066255 | A1 * | 3/2006 | Lee et al. | 315/169.3 |
| 2008/0130695 | A1 | 6/2008 | Riddle et al. | |
| 2009/0039860 | A1 * | 2/2009 | Suzuki et al. | 323/312 |
| 2009/0174338 | A1 * | 7/2009 | Muramatsu | 315/250 |

FOREIGN PATENT DOCUMENTS

| | | |
|---|---|---|
| DE | 10214421 | 10/2003 |
| DE | 102007034606 | 1/2009 |
| EP | 0 913 896 | 5/1999 |
| WO | WO 2009/049959 | 4/2009 |
| WO | WO 2009/095854 | 8/2009 |

OTHER PUBLICATIONS

Eropean Search Report 09368042.9-2415/2312911 mail date—Apr. 24, 2012.
"Practical Considerations in High Power LED Junction Temperature Measurements," by Bernie Siegal, International Conference on. Electronics Manufacturing Technolgy: Nov. 8-10, 2006, Sunway Resort Hotel, Petaling Jaya, Malalysia, Published in Piscataway, NJ, USA, 5 pgs.

* cited by examiner

*Primary Examiner* — Jacob Y Choi
*Assistant Examiner* — Henry Luong
(74) *Attorney, Agent, or Firm* — Saile Ackerman LLC; Stephen B. Ackerman

(57) ABSTRACT

Systems and methods to achieve a circuit for driving one or more infrared transmitter LEDs with temperature compensation have been disclosed. In a preferred embodiment of the invention the circuit has been applied for a rain sensing system. The junction temperature of the LED is measured and compensated by adjusting the driver current of a voltage-to-current converter driving the LED. The LED junction temperature is measured by comparing the difference in the forward diode voltage at different current densities. This voltage difference is extracted when switching the drive currents between different constant values. The measurement results are converted to digital values, which are used by a buffered dual ladder resistive DAC structure to adjust the drive current to temperature variations.

20 Claims, 4 Drawing Sheets

CIRCUIT FOR DRIVING AN INFRARED TRANSMITTER LED WITH TEMPERATURE COMPENSATION

BACKGROUND OF THE INVENTION (1) Field of the Invention

This invention relates generally to infrared transmitter light-emitting diodes (LEDs) and relates more specifically to a circuit driving infrared transmitter LEDs with temperature compensation.

(2) Description of the Prior Art

The usage of infrared transmitter and receivers is getting more and more popular and is known for numerous different applications and includes a transmitter (such as an infrared light emitting diode (LED)), which transmits light in the infrared range, and an optical receiver (phototransistor or photodiode or photoresistor), which converts the optical infrared signal into a proportional electrical signal. However, the transmitter (infrared LED, for instance) and the receiver being used (phototransistor, for instance) are highly temperature-dependent in their electro-optical properties. Without suitable temperature compensation, temperature fluctuations would be interpreted as fluctuations of information transmitted and would lead to incorrect results. Furthermore a constant current through an infrared LED is mandatory to maintain a light efficiency.

It is a challenge for the designers of infrared transmitter diodes to maintain a constant current through a LED and ensure an effective temperature compensation for the infrared LED.

There are known patents or patent publications dealing with drivers for infrared LEDs U.S. patent (U.S. Pat. No. 4,956,591 to Schierbeek et al) proposes a control for a moisture sensing assembly, adapted for mounting on the inner surface of a vehicle window or windshield to control vehicle accessories such as windshield wipers, maximizes the window area being sensed in relationship to the size of the assembly and provides immunity to interference from environmental influences. In the preferred embodiment, moisture on the outer window surface is detected by first and second moisture sensors each including infrared energy radiating diodes and radiant energy detectors which detect and process radiant energy to produce a moisture signal that is a function of the moisture on the window. A synchronizing circuit intermittently actuates the radiating diode for the two sensors individually and alternating at equally spaced intervals. The synchronizing circuit also inhibits the radiant energy detectors from processing the radiant energy signal except when the corresponding radiating diodes are emitting energy in order to prevent interference from the other radiating diodes and environmental influences. The synchronizing circuit includes a pair of oscillators, which include capacitors and coupling devices that coordinate the discharging of the capacitors in a manner that provides equal intervals between alternating output pulses from the oscillators.

U.S. patent (U.S. Pat. No. 6,781,539 to Matsui) discloses a remote control transmitter for operating an electronic appliance with an infrared ray, which is easy-to-operate and inexpensive. The remote control transmitter does not change the illumination of an illuminating device even when an operation key is manipulated. The remote control transmitter has a voltage control circuit including a diode having substantially the same power consumption as an infrared ray output means, and a control transistor connected parallel to the diode for turning on and off according to the electric signal from a microcomputer. Since a current flowing in the diode is controlled by the control transistor, a constant voltage is always applied to the driving circuit for lighting up the illuminating device regardless of a manipulation of the operation key.

U.S. patent Publication (U.S. Pat. No. 5,790,615 to Beale et al.) describes an infrared transmitter circuit causing an output current to flow to a light emission diode via a current mirror circuit constituted of three transistors by using a current supplied from a power source circuit, so that the light emission diode emits light. When a voltage V1 varied by charging a capacitor with a current flowing from the power source circuit exceeds a reference voltage (voltage V2), an output of a comparator resets a D flip-flop, so that an output of the D flip-flop varies to "0". Thus, an output of a NAND gate to which that output and a transmission signal are inputted causes a transistor (N-channel FET) to turn ON so as to stop operation of the current mirror circuit, and causes a transistor (P-channel FET) to turn OFF so as to cut a connection between the power source circuit and a power source line. Thus, it is possible to reduce power consumption in operation of a protection circuit, which stops supplying the output current to the light emission diode.

SUMMARY OF THE INVENTION

A principal object of the present invention is to achieve systems and methods using a voltage/current converter to drive one or more transmitter diodes with a constant output light from the LEDs over temperature.

A further object of the invention is to achieve accurate LED forward voltage measurement at accurate current ratios.

A further object of the invention is to extract temperature dependency of the LED voltage and digitally compensate it then.

A further object of the invention is to use a continuous time differential resistive divider to sample the LED forward voltage A further object of the invention is to use a programmable current source with accurate ratio outputs to generate the LED forward voltage.

A further object of the invention is to use a correction to the programmable current source to eliminate the resistor divider current.

A further object of the invention is to apply it for a rain sensing system

Moreover an object of the invention is to use an auto-zero switch to allow offsets to be cancelled in the measurement system.

Furthermore an object of the invention is to use a constant current drive of the LED with a voltage/current (V/I) converter, using an external NPN transistor and sense resistor.

Finally an object of the invention is to use a combination of coarse, 128, and fine, 1024, step DAC's to generate the reference voltage for the V/I output stage.

In accordance with the objects of this invention a method for a circuit for driving an infrared transmitter LED with temperature compensation has been achieved. The method invented comprises, firstly, the steps of (1) providing of one or more LED diodes, a battery voltage, an analog-to-digital converter, a LED driver comprising a resistive digital-to-analog converter structure controlling a current through the diodes, a circuit to measure a battery voltage and a difference of forward diode voltages, a programmable current sink, a circuit for offset cancellation, and a circuit for resistor load compensation, (2) calibrating the analog-to-digital converter by canceling an offset between a battery voltage and a forward voltage of said one or more LEDs, and (3) determining if the battery voltage is in an acceptable range. Furthermore the method invented comprises the steps of (4) determining temperature dependency of the forward voltage of said one or more LEDs by comparing the forward voltages when switching a drive current between two constant current values; and (5) adjusting a driver current of said one or more LEDs according to the temperature dependency determined.

In accordance with the objects of this invention a circuit for driving one or more infrared transmitter LEDs with temperature compensation has been disclosed. The circuit invented comprises, firstly, a LED transmitter drive circuitry generating a drive current for said one or more LEDs, wherein the drive current is adjusted for temperature variations by an output of a analog-to-digital converter, a programmable current sink circuitry, wherein said programmable current sink provides a drive current for said LEDs having two constant values wherein a difference of forward voltages of the LEDs is used to determine a temperature dependency of said forward voltage, and a circuitry for measuring a battery voltage and said difference of forward voltages of the LEDs. Furthermore the circuit comprises a circuitry for compensating a resistor load, wherein the resistor load is caused by resistive voltage dividers used by said circuitry for measuring a battery voltage and said difference of forward voltages of the LEDs, an analog-to-digital converter converting said measurements of the battery voltage and said difference of forward voltages of the LEDs to digital values and a Digital Signal Processor controlling an operation of the circuit for driving one or more infrared transmitter LEDs with temperature compensation

BRIEF DESCRIPTION OF THE DRAWINGS

In the accompanying drawings forming a material part of this description, there is shown.

DESCRIPTION OF THE PREFERRED EMBODIMENTS

Systems and methods for circuits for driving infrared LEDs with a constant current with temperature compensation are disclosed. A preferred embodiment of the invention is part of a rain sensing system but the invention could be applied to a number of other applications as well especially for all applications requiring to maintain a constant light efficiency of the LEDs. An on-chip Digital Signal Processor (DSP) controls the operation in order to compensate the temperature dependency of the transmitter LED.

Figure 1:
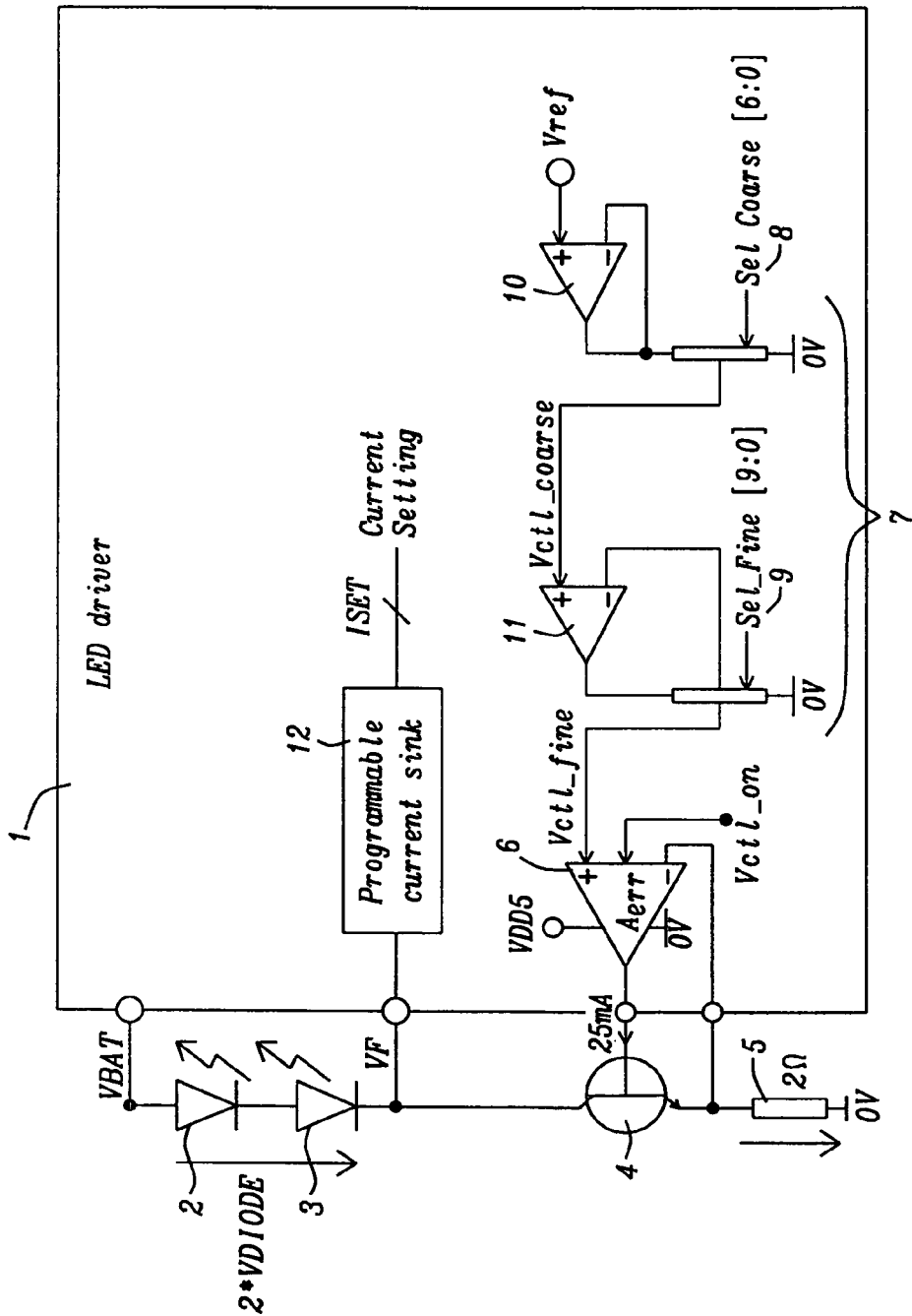
FIG. 1 illustrates a schematic for LED transmitter drive circuitry

FIG. 1 illustrates a schematic for a preferred embodiment of a LED transmitter drive circuitry. FIG. 1 shows a LED driver circuit 1 of the present invention, two infrared transmitter diodes 2 and 3, an external n-p-n bipolar transistor 4, and an external resistor 5. Using two transmitter diodes is a non-limiting example, it is possible to use only one or more than two transmitter diodes with the present invention as well. a N-th diode in series generates a $N \times \Delta V_{DIODE}(T)$ signal for extraction of temperature. Another type of external transistor could be deployed as well.

A constant drive current, $I_{DIODE}$, is generated by a voltage/current (U/I) converter comprising an external resistor 5, having as a non-limiting example a resistance of 2Ω, and an external n-p-n bipolar transistor 4.

An error amplifier 6 controls the gate of the transistor 4. The error amplifier 6 comprises in the preferred embodiment of the invention a 3.3V CMOS input differential stage and a 5V CMOS output current stage having 25 mA drive capability. Obviously other voltages or currents for the error amplifier are also possible.

The error amplifier 6 has three inputs, a control voltage Vctl_fine, a signal Vctl_on, and a voltage across said resistor 5.

The signal Vctl_on is OFF during measuring the LED junction temperature of the transmitting diodes 2 and 3. The measurement is done by applying two constant current values $(I_{D1}, I_{D2})$ from the current sink:

The following equation shows:

$$N \times \Delta V_{DIODE} = N \times V_{DIODE}(I_{D1}) - N \times V_{DIODE}(I_{D2}) = N \times (kT/q) \times \ln[I_{D1}/I_{D2}],$$

wherein N equals the number of transmitting diodes, in the example of the preferred embodiment described N=2.

The voltage drop $N \times \Delta V_{DIODE}$ across the transmitting diodes 2 and 3 is used as feedback to regulate a constant current $I_{DIODE}$. The control voltage is the combination of the buffered dual ladder resistive DAC structure 7 from a fixed reference voltage, Vref. The coarse ladder DAC 8 comprises in a preferred embodiment of the invention as a non-limiting example 128-resistors which generates an output in steps of Vref/128. The second fine ladder DAC 9 comprises in a preferred embodiment of the invention as a non-limiting example 1024 resistors generating the Vctl_fine voltage for the output V/I stage. All resistors are in the preferred embodiment of polisilicon type. Other types of resistors can be used as well In the preferred embodiment of the invention the input of a first buffer amplifier 10 is $V_{ref}$. The control voltage Vct_coarse has a range between Vref/128 and $V_{ref}$ using a selector Sel_coarse [6:0].

The 6-bit coarse DAC 8 and 10-bit fine DAC 9 are a linear resistor string and binary selection type, which guarantees a monotonous output. The input is a constant voltage, Vref=1.083-V. The two output voltages are 'Vctl_coarse' and 'Vctl_fine'. The following equations define the voltages generated:

Cgain $\{=b_0*2^0+b_1*2^1+\ldots+b_{N-1}*2^{(N-1)}=0\ldots63, N=6\}$ is the binary input code of the 6-bit coarse DAC and Vref=1.083-V is the input voltage of the 6-bit coarse ADC. The output voltage of the 6-bit coarse DAC, Vctl_coarse, is generated by $$\text{Vctl\_coarse} = \frac{Cgain + 17}{80} \times Vref$$

$$= \frac{Cgain\{=0\ldots63\}+17}{80} \times 1.083 \text{ V}.$$

Fgain $\{=b_0*2^0+b_1*2^1+\ldots+b_{N-1}*2^{(N-1)}=0\ldots1023, N=10\}$ is the binary input code of the 10-bit fine DAC and Vctl_coarse is the input voltage of the 10-bit fine ADC. The output voltage of the 10-bit fine DAC, Vctl_fine, is generated by $$\text{Vctl\_fine} = \left(\frac{Fgain + 1}{1024}\right) \times \text{Vctl\_coarse}$$

$$= \left(\frac{Fgain\{0 \ldots 1023\} + 1}{1024}\right) \times$$

$$\left(\frac{Cgain\{0 \ldots 63\} + 17}{80}\right) \times 1.083 \text{ V}.$$

The LED current is generated by $$I_{LED} = \frac{\text{Vctl\_fine}}{Rsense}$$

$$= \frac{1}{Rsense} \times \left(\frac{Fgain\{=0 \ldots 1023\} + 1}{1024}\right) \times$$

$$\left(\frac{Cgain\{=0 \ldots 63\} + 17}{80}\right) \times 1.083 \text{ V}.$$

With a 2Ω sense resistor 5 used in a preferred embodiment of the invention, this gives a maximum LED current of 541 mA.

Figure 3:
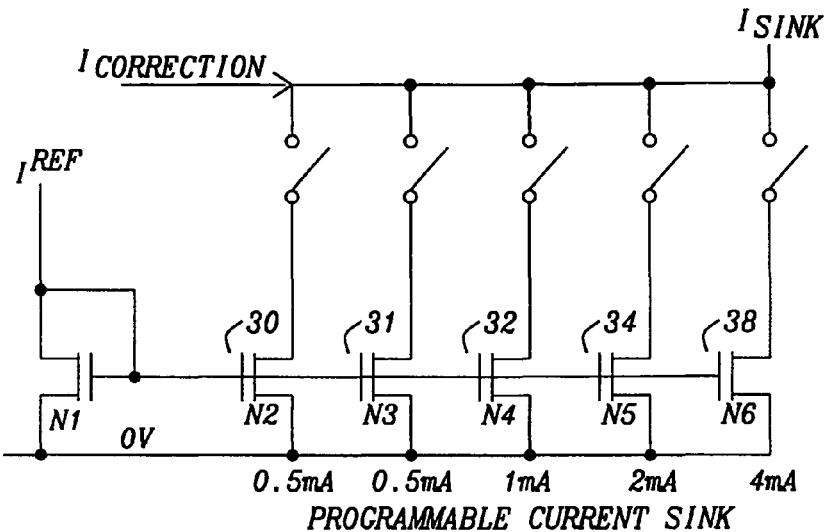
FIG. 3 shows a schematic for a programmable current sink circuit

Furthermore FIG. 1 shows a programmable current sink 12 in order to generate drive currents of different constant current values used to measure the junction temperature dependency. Details of the programmable current sink 12 are illustrated in FIG. 3.

Figure 2:
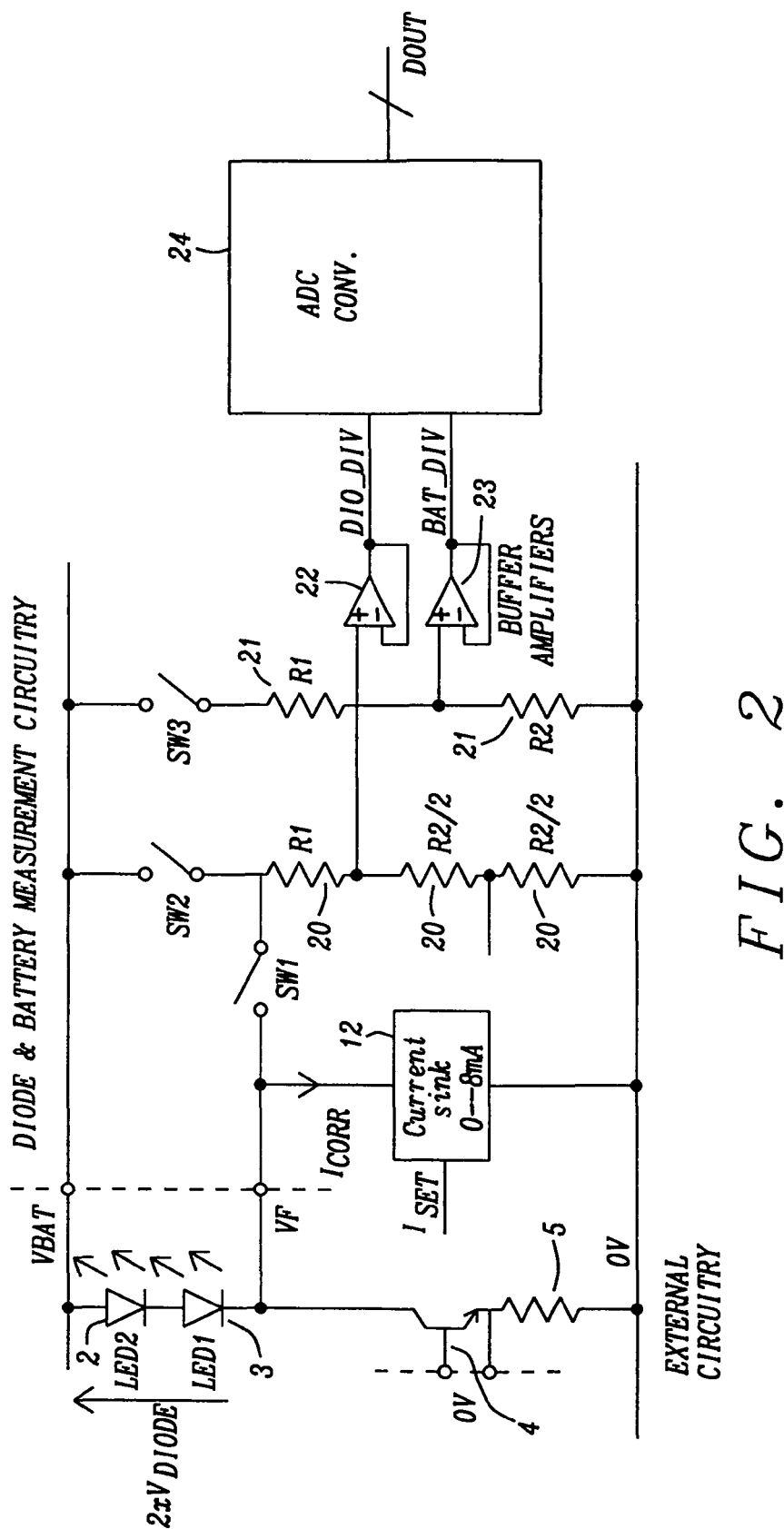
FIG. 2 shows a schematic for measurement of the battery voltage Vbat and the $\Delta V_{diode}(T)$ of the transmitter LEDs as function of temperature (T) in order to compensate variations of temperature.

Furthermore it should be noted that the circuits for measurement and load compensation are all integrated with the LED driver circuit in one integrated circuit (IC):

FIG. 2 shows a schematic for measurement of the battery voltage Vbat and the $\Delta V_{diode}$ (T) of the transmitter LEDs as function of temperature (T) in order to compensate variations of temperature. It should be understood that e.g. in case of automotive applications a battery voltage Vbat can be subjected to major variations.

The junction temperature of the diodes 2 and 3 determines the light efficiency of the transmitter diodes. Therefore the temperature dependency of the diode voltage must be measured and compensated by adjusting the driver current of the U/I converter, i.e. the base current of the transistor 4.

The technique of measuring the LED junction temperature is done by comparing the difference in the forward diode voltage at different current densities. This difference signal is proportional to the absolute Kelvin temperature and can be written as $$\Delta V_{DIODE} = V_{DIODE}(I_{D1}) - V_{DIODE}(I_{D2}) = (kT/q) * \ln [I_{D1}/I_{D2}],$$

where $I_{D1}$ and $I_{D2}$ are different diode currents, k is Bolzmann's constant, q is the electronic charge, and T is the temperature in degrees Kelvin.

Therefore the $\Delta V_{DIODE}(T)$ is extracted by measuring the forward voltage of the diode when switching the drive currents between two constant values, $I_{D1}$ and $I_{D2}$. As the system comprises in a preferred embodiment two LEDs 2 and 3 in series, this generates a $2 \times \Delta V_{DIODE}$ signal. A fixed drive current ratio of e.g. 8 ($I_{D1}/I_{D2}$), will give a $2 \times \Delta V_{DIODE}$ voltage signal of e.g. 106 mV at room temperature. However, in the system of FIG. 2 the diodes are directly connected to a battery supply voltage $V_{BAT}$, so the forward voltage must be first divided down from the battery voltage $V_{BAT}$, which can be e.g. in a range between 7V to 25V, into the operating voltage domain of the sensing circuit, in the case of the preferred embodiment e.g. 3.3V. Other operating voltage domains than 3.3 V are applicable as well. Thus, the circuitry that processes this signal on ASIC must have low offset voltage and good noise performance.

FIG. 2 shows the measurement circuitry which comprises two resistive dividers with a gain of:

$$\text{gain} = \frac{R2}{R1 + R2}$$

The output of the two dividers 20 and 21 are each buffered by an amplifier 22 or correspondently 23 configured in unity gain which drives the input of the ADC conversion circuit 24. This generates e.g. an 11-bit digital result of the differential voltage input.

In order to generate the forward voltage on the LED's an internal programmable current sink 12 is used. FIG. 3 shows a schematic for the programmable current sink circuit.

The accurate matching of MOS devices allows an accurate sink current ratio to be generated. In the design of FIG. 3 as a non-limiting example the current sink 12 can be set to: 0 mA, 0.5 mA, 1 mA, 2 mA, 4 mA, 8 mA by switching the scaled MOS current mirror devices 30, 31, 32, 34, and 38. The current sink is ratioed by 1, 1, 2, 4, 8 of 0.5 mA, and gives step up to 8 mA when there is all switched ON.

Figure 4:
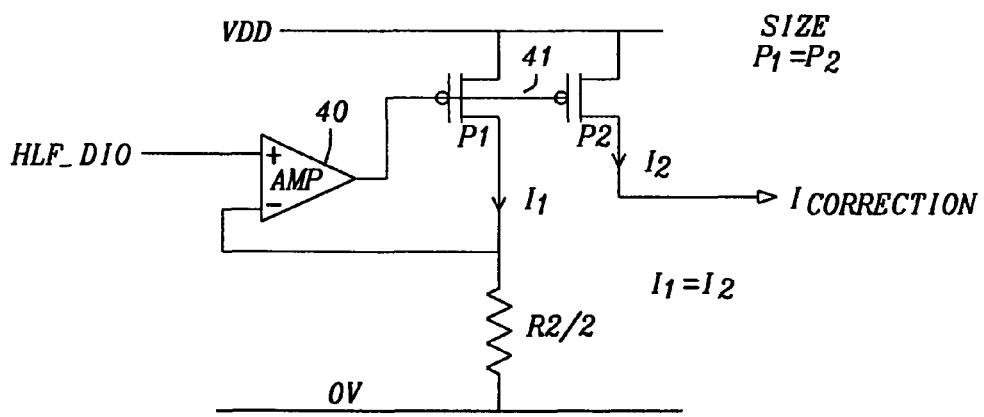
FIG. 4 illustrates a schematic for the resistor load compensation circuit

However the LED current will also have the resistive potential divider loading as well, which needs to be cancelled (as this current varies with battery voltage and resistor temperature/process changes). FIG. 4 shows a circuit that cancels the resistive load current. This circuit uses an amplifier 40 to mirror the 'hlf_dio' voltage shown in FIG. 2, across an identical resistor, R2/2. Using a current mirror 41, comprising two P-MOS transistors P1 and P2, an output current $I_{CORRECTION}$ is generated that equals the resistive load current; this is then subtracted from the e.g. 0.5 mA current setting and from any other current setting in the sinkin the sink dependent upon which current has been selected from the current sink, resulting in a accurate current ratio generation.

Three measurements are available by configuration of the two resistive dividers 20 and 21, shown in FIG. 2, by switches SW1, SW2, AND SW3. These are:
1. Offset cancellation: SW1 open, SW2 closed, SW3 closed. This allows any offsets between the 'bat_div' and 'dio_div' input paths of the ADC converter 24 to be measured and the result from the ADC is the 'zero' calibration measurement; i.e. this ADC measurement is subtracted from subsequent measurements. The substraction is performed digitally after the ADC conversion by using a dedicated Digital Signal Processing (DSP) section.
2. Battery voltage measurement: SW1 open, SW2 open, SW3 closed. This allows the battery voltage to be measured as 'dio_div' will be at 0V. This measurement is used in the system to determine that the battery voltage is in an acceptable range for correct system operation.
3. Diode forward voltage measurement: SW1 closed, SW2 open, SW3 closed. This allows the diode forward voltage to be measured. By switching the current sink from 0.5 mA to 8 mA gives the $\Delta V_{DIODE}$ measurement required.
4. Power off state: SW1 open, SW2 open, SW3 open. This disconnects the resistive dividers from the battery and LED.

With the above circuitry, the temperature dependency of the transmitter LED is measured in 2 steps with an ADC conversion time, $T_{CONV}$=32 µsec. The output signal $D_{OUT}$ of the ADC converter 24 is a measure for the temperature dependency of the transmitter diodes. The signal compensates the current $I_{DIODE}$ for temperature variations via the programmable current sink 12.

Figure 5:
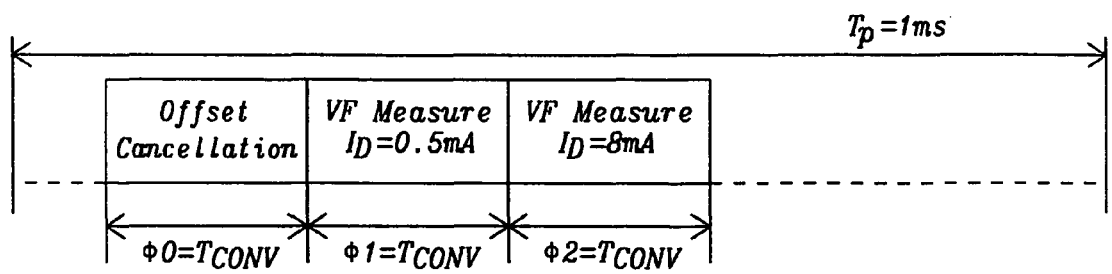
FIG. 5 shows a time chart of the measurement of the transmitter LEDs forward voltage difference with a current density ratio=8.

FIG. 5 shows a time chart of the measurement of the transmitter LEDs forward voltage difference with a current density ratio=8. FIG. 5 illustrates three measurement steps, having all in a preferred embodiment as non-limiting example, a duration of $T_{CONV}$=32 μsec. In a first step Ø0 offset cancellation is performed, followed by a first part Ø1 of the diode forward voltage measurement, i.e. a measurement with a low current e.g. $I_D$=0.5 mA. The next step comprises the second part of the diode forward voltage measurement, i.e. a measurement with a higher current e.g. $I_D$=8 mA. Furthermore FIG. 5 shows that in a period of 1 ms the measurements are performed e.g. in 3×TCONV=96 μs.

The LED is transmitted with minimum width, 32 μs, in every ms. The dode voltage forward (VF) measurement is performed directly after every LED transmission in order to compensate the temperature dependency for next LED transmission. The offset cancellation is, as 'zero' calibration, part of the VF measurement.

Figure 6:
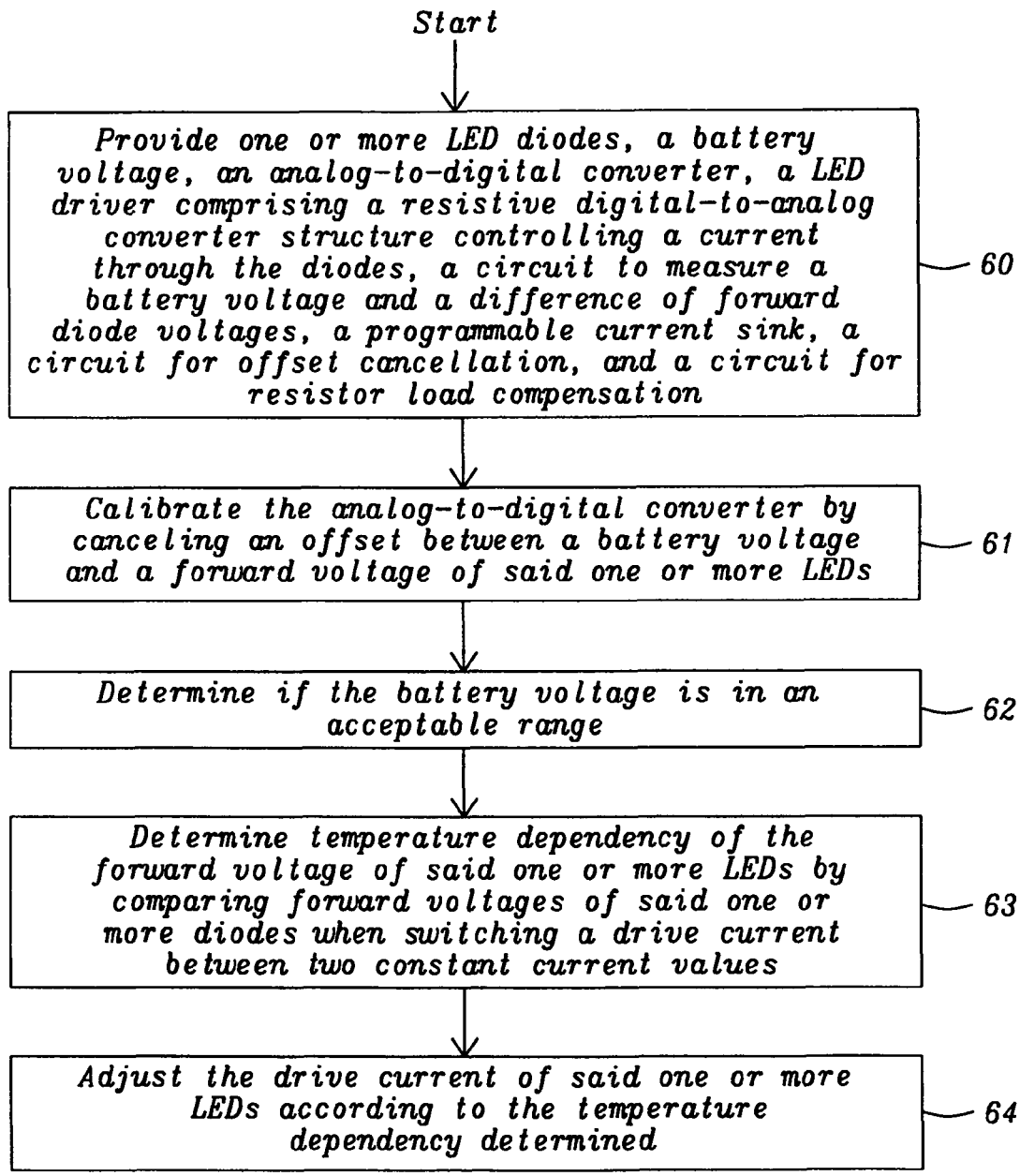
FIG. 6 illustrates a flowchart of a method invented for a digital audio interface, which doesn't require a handover procedure when switching between audio sources and allowing to switch between audio data sources of unknown rates.

FIG. 6 illustrates a flowchart of a method invented to measure the temperature dependency of transmitter LED diodes A first step 60 describes the provision of one or more LED diodes, a battery voltage, an analog-to-digital converter, a LED driver comprising a resistive digital-to-analog converter structure controlling a current through the diodes, a circuit to measure a battery voltage and a difference of forward diode voltages, a programmable current sink, a circuit for offset cancellation, and a circuit for resistor load compensation. A next step 61 illustrates calibrating the analog-to-digital converter by canceling an offset between a battery voltage and a forward voltage of said one or more LEDs. Step 62 describes determining if the battery voltage is in an acceptable range. Step 63 teaches determining temperature dependency of the forward voltage of said one or more LEDs by comparing the forward voltages when switching a drive current between two constant current values. Step 64 discloses adjusting a driver current of said one or more LEDs according to the temperature dependency determined.

While the invention has been particularly shown and described with reference to the preferred embodiments thereof, it will be understood by those skilled in the art that various changes in form and details may be made without departing from the spirit and scope of the invention.

What is claimed is:

1. A method for driving an infrared transmitter LED with temperature compensation for a circuit comprising the following steps:
   (1) providing one or more LED diodes, a battery voltage, an analog-to-digital converter, a LED driver comprising a resistive digital-to-analog converter structure controlling a current through the diodes, wherein the digital-to-analog converter structure comprises a coarse DAC inputting all bits of the output of the coarse DAC to a fine DAC, a circuit to measure a battery voltage and a difference of forward diode voltages, a programmable current sink, a circuit for offset cancellation, and a circuit for resistor load compensation;
   (2) calibrating the analog-to-digital converter by canceling an offset between a battery voltage and a forward voltage of said one or more LEDs;
   (3) determining if the battery voltage is in an acceptable range;
   (4) determining temperature dependency of the forward voltage of said one or more LEDs by comparing the forward voltages when switching a drive current between two constant current values; and
   (5) adjusting a driver current of said one or more LEDs according to the temperature dependency wherein the driver current is adjusted using the resistive digital-to-analog converter structure.

2. The method of claim 1 wherein said programmable current sink is used to generate said drive currents switching between two constant current values.

3. The method of claim 1 wherein said calibration of the analog-to-digital converter is performed by measuring the battery voltage and the diode forward voltage and subtract the related analog-to-digital converted measurement from subsequent measurements.

4. The method of claim 1 wherein said determination if the battery voltage is in an acceptable range performed by a measurement circuit comprising two resistive dividers.

5. The method of claim 4 wherein said determination of the temperature dependency is performed by said measurement circuit comprising two resistive dividers.

6. The method of claim 1 wherein said resistive digital-to-analog converter structure is a buffered dual ladder resistive digital-to-analog converter structure.

7. The method of claim 1 wherein said coarse DAC is a 6-bit DAC and said fine DAC is a 10-bit DAC.

8. The method of claim 1 wherein the output of said resistive digital-to-analog converter structure is an input of an error amplifier controlling the drive current of said LEDs.

9. The method of claim 8 wherein the output of said error amplifier is the input of a voltage-to-current converter setting said drive current.

10. The method of claim 9 wherein said voltage-to-current converter comprises a transistor and a resistor, wherein the output of said error amplifier controls the base of said transistor.

11. The method of claim 1 wherein said circuit for driving an infrared transmitter LED is used for a rain-sensing system.

12. The method of claim 1 wherein said adjustment of the LED driver current according to the temperature dependency is performed after every LED transmission.

13. A circuit for driving one or more infrared transmitter LEDs with temperature compensation comprises:
   a LED transmitter drive circuitry, generating a drive current for said one or more LEDs, wherein the drive current is adjusted for temperature variations by an output of the analog-to-digital converter, comprising
      a resistive digital-to-analog converter structure having two inputs, wherein a first input is a reference voltage and a second input is an output of said analog-to-digital converter;
      an error amplifier having three inputs and an output wherein a first input is an output of said resistive digital-to-analog converter structure, a second input is a control signal and a third input is a feedback indicating a value of drive current of the LEDs, and the output is a voltage controlling a voltage-to-current converter wherein an output of said voltage-to-current converter is the current driving the LEDs; and
   a programmable current sink circuitry, wherein said programmable current sink provides a drive current for said LEDs having two constant values wherein a difference of forward voltages of the LEDs is used to determine a temperature dependency of said forward voltages, wherein said programmable current sink circuitry comprises an arrangement of matched scaled metal-oxide-semiconductor (MOS) current mirror devices and a correspondent arrangement of switches allowing generating values of currents in multiple steps as required for measuring forward voltage of the LEDs using different values of current;

a circuitry for measuring a battery voltage and said difference of forward voltages of the LEDs;

a circuitry for compensating a resistor load, wherein the resistor load is caused by resistive voltage dividers used by said circuitry for measuring a battery voltage and said difference of forward voltages of the LEDs; and the analog-to-digital converter converting said measurements of the battery voltage and said difference of forward voltages of the LEDs to digital values.

14. The circuit for driving one or more infrared transmitter LEDs of claim 13, wherein said resistive digital-to-analog converter structure is a buffered dual ladder resistive digital-to-analog converter structure.

15. The circuit for driving one or more infrared transmitter LEDs of claim 14, wherein said input differential stage is a CMOS input differential stage and said output current stage is a CMOS current output stage having a higher supply voltage than the input differential stage.

16. The circuit for driving one or more infrared transmitter LED of claim 13, wherein said error amplifier comprises an input differential stage and an output current stage.

17. The circuit for driving one or more infrared transmitter LEDs of claim 13, wherein said voltage-to-current converter comprises a transistor, whose base is controlled by said error amplifier and a resistor, wherein the LED drive current is flowing through the resistor.

18. The circuit for driving one or more infrared transmitter LEDs of claim 13, wherein said circuitry for measuring the battery voltage and said difference of forward voltages comprises two circuit branches, between the battery voltages and ground voltage, wherein a first branch comprises a first switch activating the first branch and a first voltage divider wherein a voltage of a midpoint of the first voltage divider indicates the battery voltage, and wherein a second branch comprises a second switch activating the second branch, a third switch connects to a tap point for sensing the forward LED voltage, and a second voltage divider wherein a voltage of a midpoint of the second voltage divider indicates the forward voltage of the LEDs.

19. The circuit for driving one or more infrared transmitter LEDs of claim 13, wherein said circuitry for compensating a resistor load comprises an amplifier mirroring a voltage of said circuitry measuring said difference of forward voltages of the LEDs, generating an output current equal to a resistive load current, which is subtracted from a current setting of said current sink circuitry.

20. The circuit for driving one or more infrared transmitter LEDs of claim 13, wherein the LED transmitter drive circuitry, the programmable current sink circuitry, the circuitry for measuring a battery voltage and said difference of forward voltages of the LEDs, the circuitry for compensating a resistor load, and the analog-to-digital converter are all integrated in one integrated circuit.

* * * * *